Jan. 26, 1926. 1,570,928
G. P. THOMAS
METAL PERFORATING MACHINE
Filed June 26, 1924 7 Sheets-Sheet 1

Jan. 26, 1926.

G. P. THOMAS 1,570,928

METAL PERFORATING MACHINE

Filed June 26, 1924     7 Sheets-Sheet 3

WITNESSES

INVENTOR

Jan. 26, 1926.  1,570,928
G. P. THOMAS
METAL PERFORATING MACHINE
Filed June 26, 1924  7 Sheets-Sheet 4

FIG.6.

WITNESSES
J. Herbert Bradley.

INVENTOR
George P. Thomas
by Winter, Brown & Critchlow
his attorneys.

Jan. 26, 1926.

G. P. THOMAS

METAL PERFORATING MACHINE

Filed June 26, 1924

INVENTOR
George P. Thomas
by Winter Brown & Critchlow
his attorneys.

WITNESSES
J. Herbert Bradley.

Jan. 26, 1926.

G. P. THOMAS 1,570,928

METAL PERFORATING MACHINE

Filed June 26, 1924     7 Sheets-Sheet 6

INVENTOR

WITNESSES

Jan. 26, 1926. 1,570,928
G. P. THOMAS
METAL PERFORATING MACHINE
Filed June 26, 1924 7 Sheets-Sheet 7

Patented Jan. 26, 1926.

1,570,928

UNITED STATES PATENT OFFICE.

GEORGE P. THOMAS, OF GLENSHAW, PENNSYLVANIA.

METAL-PERFORATING MACHINE.

Application filed June 26, 1924. Serial No. 722,447.

*To all whom it may concern:*

Be it known that I, GEORGE P. THOMAS, a citizen of the United States, and a resident of Glenshaw, in the county of Allegheny and State of Pennsylvania, have invented a new and useful Improvement in Metal-Perforating Machines, of which the following is a specification.

The invention relates to machines for punching or otherwise perforating metal blanks, such as structural steel plates and shapes. While some of the features of the invention are applicable to various types of punching machines, others are particularly applicable to the general type of machines in which a templet and work support is arranged for universal movements in a horizontal plane with relation to a perforating machine, and in which an index finger or finder pin is arranged to cooperate with a templet borne by the support to properly position a blank for perforating it.

An object of the invention is to improve the construction of universally movable templet and work supports of this type, to the end that they may be readily moved to required positions regardless of the size and shapes of blanks being perforated, and to the further end that the handling of blanks may be facilitated both before and after they are perforated.

A further object is to provide improved mechanism for manually moving universally movable templet and work supports, to the end that they may be easily and quickly moved regardless of the size and character of the blanks being perforated.

A further object is to provide a machine of this general type with automatic means operated by power mechanism to move a work support to bring a blank to proper punching position after the support has been otherwise brought close to such position.

A further and more specific object is to provide a machine of this general type with a finder pin adapted to rest freely on a templet, and with power operated mechanism for forcing the pin into a templet perforation after the pin has partially entered the perforation, the further entry of the pin being effective to properly position or center a blank for punching.

The invention is illustrated in the accompanying drawings, of which

The machine provided according to this invention includes a perforating machine and a movable work and templet support.

The perforating machine may be, and in the preferred embodiment of the invention is, a metal punch provided with a reciprocating head and with a clutch for controlling its reciprocation. As far as concerns some features of the invention, the work and templet support may be variously constructed and operated. However, in the preferred embodiment it is of the type which is universally movable in a horizontal plane with relation to a perforating machine.

One feature of the invention has to do with the construction of universally movable work and templet supports. They have in some instances heretofore been formed by mounting upon a stationary table an intermediate frame arranged to move to and from a punch, and by mounting upon the intermediate frame a top frame or carriage for movements at right angles to those of the intermediate frame. In such work and templet supports a plate to be punched is arranged in and clamped to the top frame; and, when the work support is constructed to receive large plates, rollers are carried by the intermediate frame and are spring-pressed upwardly against the lower face of a plate carried by the top frame. This arrangement of rollers has been found to be objectionable for several reasons. For example, to effectively support a large plate the spring pressure upon the rollers must be so great that it is difficult, upon required movements of the top frame, for the essential members of it to depress the rollers sufficiently to permit such movements. Also, when a plate to be punched has an edge inclined to the general rectangular edges of the plate, such edge, when the top frame is moved, wedges against the side of a roller which is spring-pressed above the plane of the plate, thus making it impossible to further move the top frame without manually depressing the so wedged roller. Of course, this retards the punching operation. Furthermore, when a plate is supported within a frame it is necessary to bodily lift the plate for placing it in and removing it from the frame.

To overcome these and other objectionable features of universally movable templet and work supports, is one of the specific objects of this invention, according to which an elongate carriage is mounted upon a side of the intermediate frame and is provided with a plurality of clamps for engaging one side of a blank and of a templet, both of which otherwise rest freely upon rollers carried by the intermediate frame. Each of these rollers preferably extends as a unit from one side to the other of the frame. By providing a carriage of this type and mounting it on the side of an intermediate frame, none of the parts of the carriage extends over the rollers of the intermediate frame, and hence there is no interference of the sort explained above. A further advantage is that blanks may be moved to and from the carriage sidewise upon the intermediate frame rollers without lifting the blanks upwardly to place them in or remove them from a frame.

Figure 1:
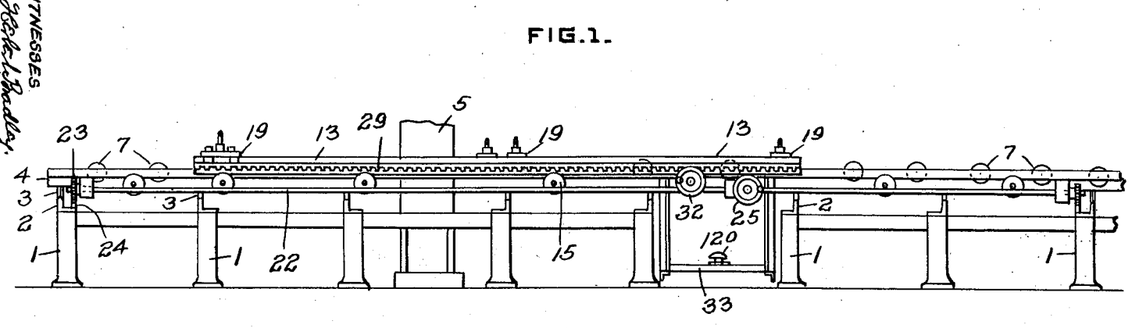
Fig. 1 is an elevation of the machine, certain parts of the perforating machine and finder pin mechanism being omitted for simplicity of illustration.
Figure 2:
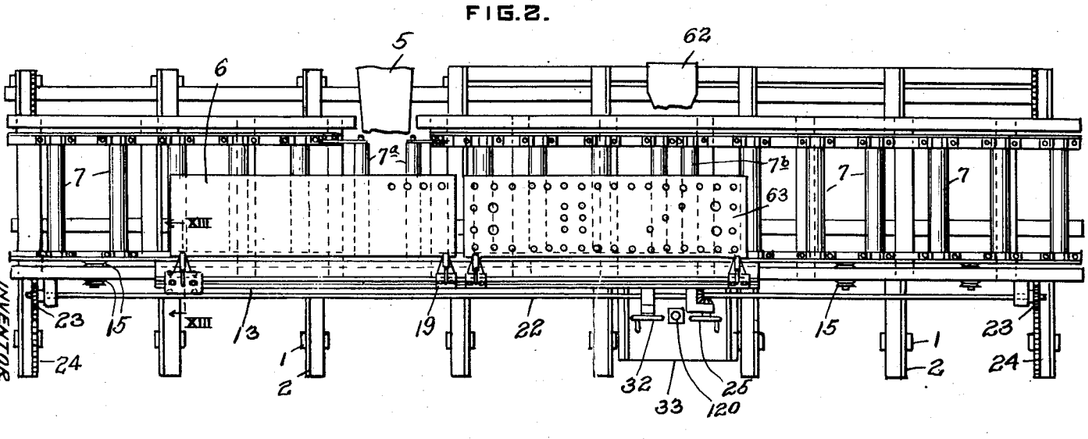
Fig. 2 a plan view of the machine shown in Fig. 1.

Having reference to the illustrative embodiment of this feature of the invention, and referring first to Figs. 1 and 2, the stationary table may comprise a plurality of standards 1. Tracks 2, which may be in the form of angles, may be arranged upon the tops of standards 1 to receive rollers 3 borne by an intermediate frame 4, so that such frame may be moved to and from a perforating machine, such as a punch 5. Preferably, the tracks 2 on the standards at the ends of the stationary table have convex faces for receiving and guiding grooved end rolls 3, and the tracks on all intermediate standards have plane faces on which cylindrical frame rolls 3 rest. By thus using plane-faced tracks 2 and cylindrical rolls 3 intermediate the ends of the work support, these tracks need not be aligned with great exactness in relation to the intermediate rolls, the frame being held in proper alignment by the end rolls and tracks.

Figure 4:
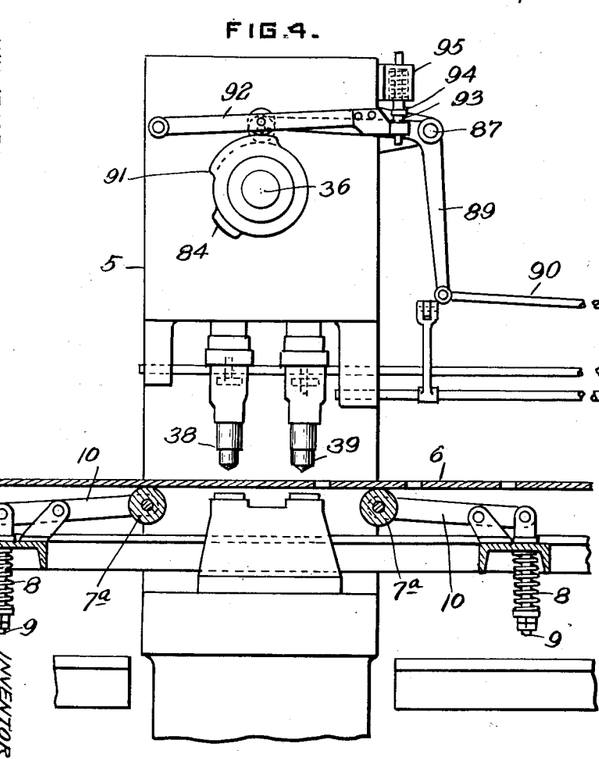
Fig. 4 a vertical sectional view to a still larger scale of the central portions of the machine, the plane of view being indicated by the line IV—IV, Fig. 3.

For supporting a blank to be punched, such as a plate 6, frame 4 is provided with a plurality of idle rollers 7, which preferably extend continuously from one side to the other of the frame. With the exception of the blank-supporting rollers 7ª (Fig. 4) adjacent to the punching machine 5, the rollers for supporting a plate 6 remain in fixed positions in frame 4. In other words, they are not urged upwardly against a plate. To move a blank upwardly at the end of each punching operation so that such burrs as may be formed on its lower face may be disengaged from a die, rollers 7ª adjacent to the punching machine may be urged upwardly by means of springs 8 surrounding rods 9 attached to one end of pivoted arms 10, the rollers being rotatably borne by the other end of these arms. Furthermore, rollers 7ᵇ adjacent to the finder pin mechanism presently to be explained, are preferably mounted in vertically adjustable housings so that the finder pin mechanism may properly cooperate with templets of different thicknesses. As shown in Fig. 4, the bearing blocks at the ends of rolls 7ᵇ may be mounted for vertical adjustment in housings 11 supported by adjusting screws 12.

Figure 6:
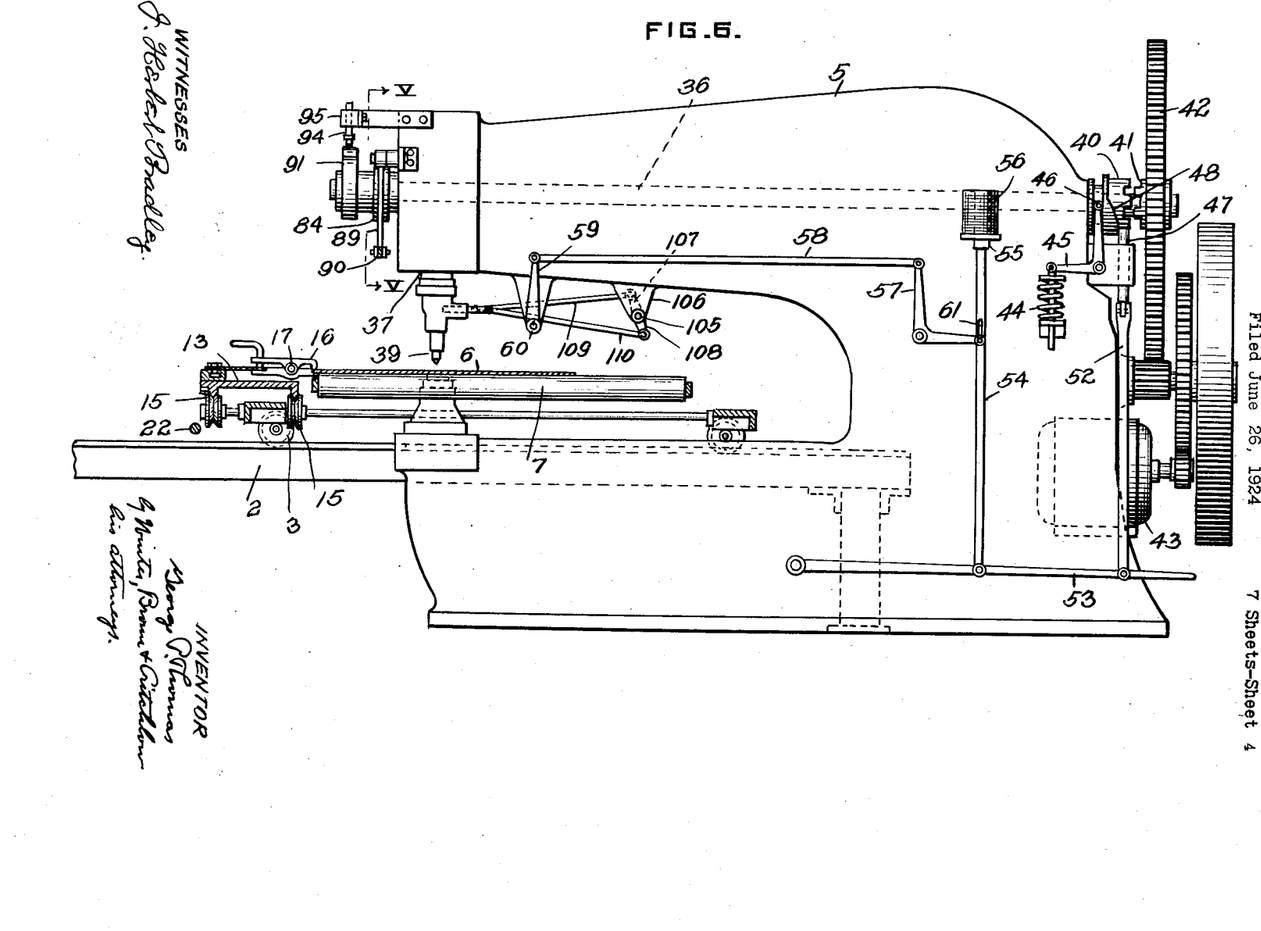
Fig. 6 a side view of a perforating machine, in this instance a punch, the side view being combined with a transverse sectional view of the work support, the plane of view being indicated by the line VI—VI, Fig. 3.
Figures 7, 8, 9:
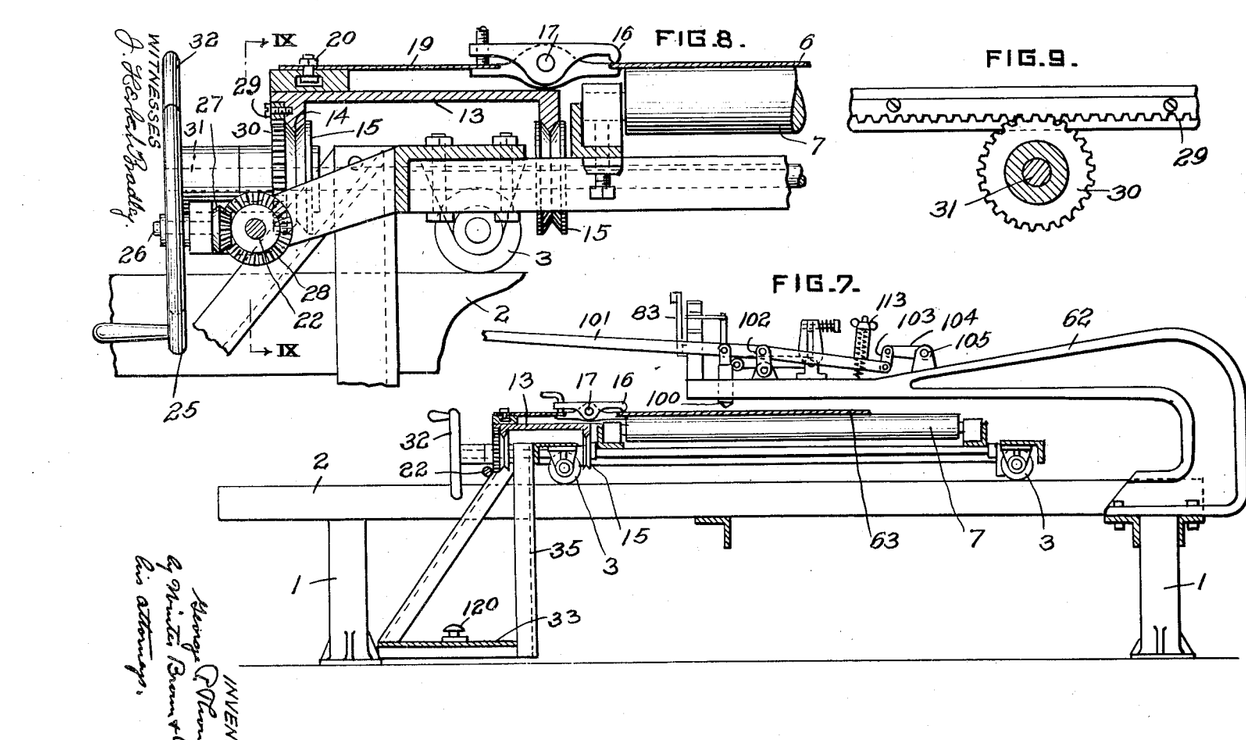
Fig. 7 a vertical sectional view taken on the line VII—VII, Fig. 3.
Fig. 8 an enlargement of a part of the left hand portion of the work and templet support illustrated in Fig. 7.
Fig. 9 a vertical sectional view taken on the line IX—IX, Fig. 8.

Upon one side of frame 4 there is mounted for movements at right angles to that of the frame a carriage 13 provided with means for engaging a side of a blank 6 and a templet 63, both of which rest freely upon rollers 7. The lower side of this carriage may be provided with rails 14 (Figs. 6, 7 and 8) adapted to rest upon grooved idle rollers 1 borne by frame 4, so as to permit free movement of the carriage upon the frame. Any suitable form of clamps may be used for attaching a blank and a templet to the carriage. As shown in Fig. 8 the clamps may comprise a pair of jaws 16 pivoted to each other as at 17 and attached to a resilient plate 19. That the clamps may be moved to various positions upon the carriage to engage different sized blanks and templets, each clamp plate 19 may be attached to the carriage by bolts 20 having their heads arranged in a continuous T-slot formed in the upper face of the carriage.

Figure 13:
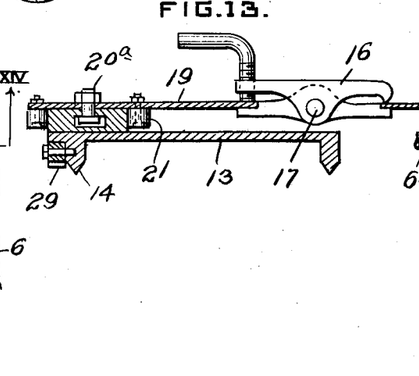
Fig. 13 a sectional view of the carriage clamp at the left end of the machine, the plane of view being indicated by the line XIII—XIII, Fig. 2.
Figure 14:
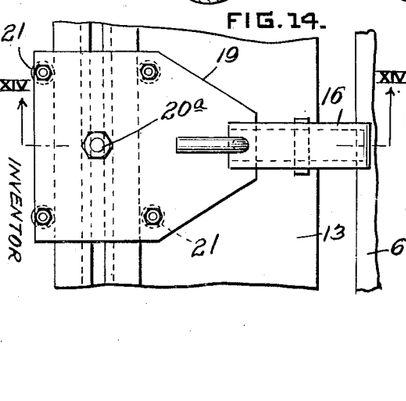
Fig. 14 a plan view of the clamp shown in Fig. 13.

For punching some classes of work, as for example screen plates which are provided with a great many holes, the punching of which elongates the plate, it is desirable to permit one blank-engaging clamp to move with relation to the carriage to compensate for this elongation of the plate. For this purpose one blank-engaging clamp, preferably the rear one, may, as shown in Figs. 13 and 14, be loosely secured to the carriage by a bolt 20ª the nut of which is not tightened. The movement of this clamp upon the carriage may be facilitated by providing the clamp with rollers 21 (Fig. 13) adapted to bear against vertical faces of a part of the carriage.

By providing a carriage having the characteristics of that just explained, a plate attached to it may be freely and properly supported upon the frame rollers 7 in such a manner that movements of the carriage upon the frame may be effected without interference between the rollers and plate. Also the rollers need not be depressed by parts of the carriage. Furthermore, a plate to be punched may be slid laterally upon rollers 7 and similarly removed from them, thus eliminating the necessity of lifting the plate for placing it in and removing it from a frame of the general type heretofore used in universally movable work and templet supports.

Another feature of the invention has to do with means for moving the frame upon the table and the carriage upon the frame. Customarily, the movements of both the carriage and frame are effected manually by a workman who, for this purpose, directly engages the carriage. When a long carriage is provided, capable of having long plates attached to it, it is difficult to move a frame to and from a punch when a workman manipulates the carriage, as he necessarily must, at a position near one end of the frame. The reason for this is that pushing or pulling upon one end of the frame causes it to bind upon the stationary table supports.

In the practice of this feature of the invention mechanical driving connections are provided, not only for moving the frame upon the table, but also for moving the carriage upon the frame; and operating members for such connections are adjacently disposed so that both may be conveniently manipulated by a single workman while standing in one position. These are preferably rack and pinion connections. Referring to the illustrative embodiment of this feature of the invention, the rack and pinion connections for moving the frame upon the table preferably comprise a rotatable shaft 22 (Figs. 1 and 2) mounted upon, and extending substantially the full length of, the front side of frame 4. The ends of this shaft are provided with pinions 23 adapted to mesh with racks 24 mounted upon the end standards 1 of the table. As seen particularly in Fig. 8, the rotation of shaft 22 may be effected by means of a hand wheel 25 attached to a shaft 26 provided with a beveled pinion 27 meshing with a bevel pinion 28 attached to shaft 22.

For moving the carriage upon the frame, the former is preferably provided with a rack 29 (Figs. 8 and 9), which may be attached to the outside edge of the carriage and may be engaged by a pinion 30 attached to a shaft 31 provided with a hand wheel 32 arranged adjacent to the hand wheel 25. These hand wheels are in such position adjacent to each other and to the finder pin mechanism that a workman, while observing the finder pin and templet, may engage one by each hand to effect, through the rack and pinion connections explained, desired movements of the frame upon the table and the carriage upon the frame. If desired, a platform 33 for a workman to stand upon may be suspended from frame 4 by supports 35 in the manner generally illustrated in Fig. 7.

A further and the most important feature of the invention has to do with the provision of means for automatically placing or centering a blank in proper punching position after the work support has been moved, as for example by the rack and pinion driving connections just explained, so as to bring a blank close to such position. For this purpose there is provided power mechanism adapted to cooperate with a templet to move it, and through it to move the work support and blank attached to it, to bring the blank to proper punching position. Preferably, this is effected by providing a finder or index pin arranged to bear freely upon a face of a templet perforated according to the arrangement and spacing of holes to be punched in a blank, and providing means, rendered effective by partial entry of the pin into a templet perforation, for forcing the pin further into the perforation to move the work support. The templet perforation may be cylindrical and the finder pin be provided with a tapered end, so that when the end of the pin partially enters a perforation the power mechanism for forcing the pin further into the perforation will cause the tapered side of the pin to bear upon the side of the perforation and move the work support. If desired, the perforations may have beveled edges, or in other words be in the usual form of holes for receiving countersunk rivets. Preferably, the finder pin is arranged above the templet with its end bearing upon its upper face, and preferably also the finder pin is mounted for longitudinal movements towards and from the templet.

The power mechanism for the final positioning or centering of a blank is preferably the means for throwing or releasing a clutch to place the perforating machine in operation, suitable driving connections being arranged between such controlling means and the finder pin or its equivalent. The clutch-throwing means is preferably an electromagnet adapted to be energized by an electric current flowing through a circuit which may be closed by and upon the partial entry of the finder pin into a templet perforation. By such instrumentalities the energizing of the magnet causes its movable element, preferably an armature, to both control the clutch and force the finder pin further into a perforation to center the work.

Since in the preferred and illustrative embodiment of the invention the finder pin mechanism is coordinated with the punching machine, the general construction of the latter will first be explained. As shown in Fig. 6, the punch 5 includes a rotatable driven shaft 36 for effecting in the usual manner the reciprocation of a punching head 37, which is shown in Fig. 4 as being provided with two punches 38 and 39, although it may be equipped with any desired number of punches. The rotation of shaft 36 to reciprocate the punching head is controlled by means of a clutch, which may be of standard and well known construction including a movable element 40 feathered upon shaft 36 and adapted to engage a second element 41 attached to the hub of a gear 42 rotatably mounted on shaft 36 and driven by a motor 43 through the connections illustrated.

Normally clutch element 40 is yieldingly urged towards its cooperating element 41 by springs 44 (Figs. 6 and 15) acting through bell-crank levers 45 and pins 46 attached to them and engaging clutch element 40. A pin 47, adapted to engage a cam 48 attached to clutch element 40, holds such element against engagement with its cooperating element 41. This pin is pivotally mounted on the end of an arm 49 which is attached to a shaft 50 which may be rocked to release pin 47 from its engagement with cam 48. For so rocking shaft 50, it has attached to it an arm 51 which may be connected by a link 52, a pivoted lever 53, and a rod 54, to a movable armature 55 forming part of an electro-magnet including a coil 56. Through these instrumentalities the energizing of coil 56 of the electro-magnet causes its armature 55 to move upwardly, and in consequence thereof pin 47 is released from clutch member 40 through the connections just explained.

Rod 54 is also connected, through a bell-crank lever 57, a link 58 and an arm 59 to a shaft 60 which extends to the finder-pin mechanism for a purpose presently to be explained. The connection of bell-crank lever 57 to rod 54 may be through a slot 61 so that such rod may move downwardly as soon as the magnet is deenergized and thus permit clutch pin 47 to rise and engage clutch cam 48 so that the continued rotation of shaft 36 may, at the proper time and through such cam and pin, remove clutch element 40 from its engagement with clutch element 41.

Figure 10:
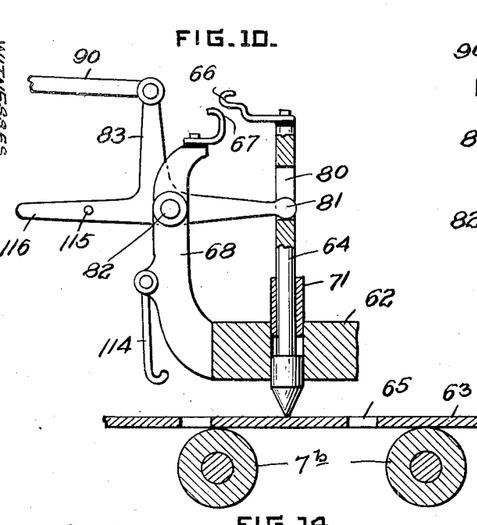
Fig. 10 a vertical central sectional view of a finder pin combined with an elevation of parts attached to it.
Figures 15, 16:
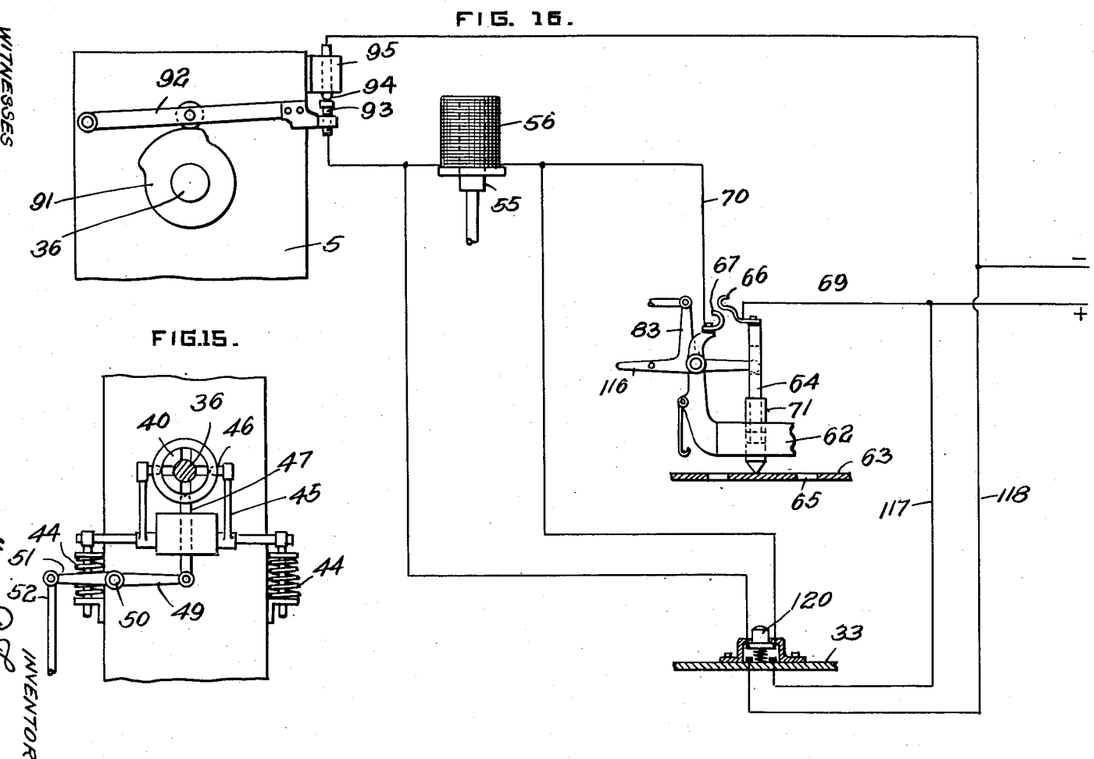
Fig. 15 a view taken substantially on the line XV—XV, Fig. 3, illustrating a detail of clutch-control mechanism.
Fig. 16 a wiring diagram of certain electrically controlled parts of the entire machine.

Having reference now to the finder-pin mechanism, it is mounted upon a frame 62 which overhangs the perforated templet 63 supported by rollers 7. As seen particularly in Figs. 10 and 11, a finder pin 64 is mounted for longitudinal movements in frame 62 with its lower end resting freely on the templet. In Fig. 10 the lower end of the finder pin is shown as being tapered to cooperate with cylindrical perforations 65 in templet 63, and in Fig. 11 the finder pin is shown as having a rather blunt end adapted to cooperate with beveled edged perforations 65$^a$ in the templet. Attached to the finder pin, and movable with it, there is an electric contactor 66 adapted to contact with a fixed contactor 67 when the lower end of the finder pin has partially entered a perforation 65, such entry of the finder pin in a perforation taking place when the work support has been moved to a position to bring the perforation into partial registry with the finder pin. Contactor 67 is attached to a bracket 68 which in turn is attached to a side of frame 62. As seen in Fig. 16, contactors 66 and 67 are connected, respectively, to conductors 69 and 70 which form part of an electric circuit through electro-magnet coil 56.

Surrounding finder pin 64 there is a sleeve 71 through which the finder pin may freely move, and which is pivoted to an arm 72, rotatably mounted on shaft 60. Forming a part of arm 72 there is a vertically disposed arm 73 which carries for longitudinal movement in it a pin 74 attached to an arm 75 which is keyed to shaft 60. Arranged between arm 73 and a tension-adjusting nut 76 on pin 74 there is a spring 77 which acts to hold arm 73 and 75 in the position indicated in Fig. 11.

With such finder pin mechanism, an operator may move the work support until the end of the pin partially enters a templet perforation, and such movement of the support may obviously be much more quickly effected than a movement of the support to bring a templet perforation into exact registration with the finder pin. When the finder pin partially enters a templet perforation, contactor 66 contacts with contactor 67 and closes the circuit through coil 56 with the result that armature 55 is raised to permit the punching machine clutch to be closed, and to rock shaft 60. The rocking of this shaft causes an arm 72 (Fig. 11) and sleeve 71, which is attached to it, to move downwardly. In this downward movement of sleeve 71 its lower edge engages the shoulder formed on pin 64 and forces the pin further into the templet perforation, causing the templet to move into exact registration with the pin. Such movement of the templet causes the work-support to correspondingly move to bring the work, that is to say plate 6, into proper punching position. This is done simultaneously with the downward movement of reciprocating punch head 37 and before the punches attached to it engage plate 6.

Figure 11:
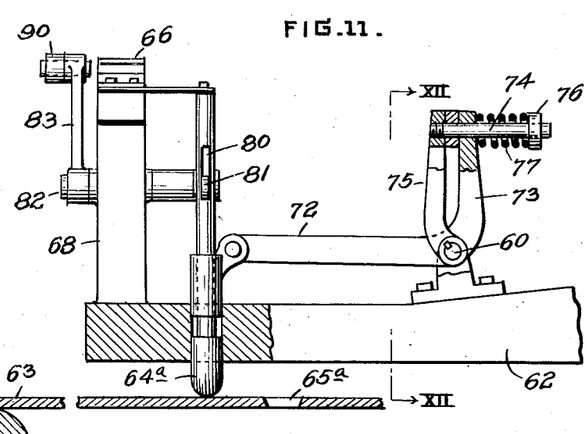
Fig. 11 an elevation of the finder pin shown in Fig. 10, the view being taken at right angles to Fig. 10, and including, part in elevation and part in section, an additional connection to the finder pin, the sectional portion of the additional connection being taken on the line XI—XI, Fig. 12.
Figure 12:
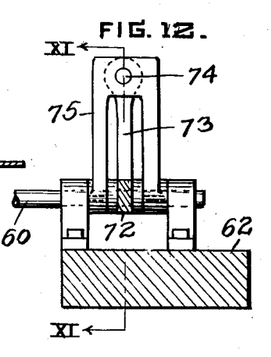
Fig. 12 a view taken on the plane indicated by the line XII—XII, Fig. 11.

Injury to the connections for forcing the finder pin downwardly, in case the circuit through the magnet coil should be closed when the end of the finder pin rests upon the templet rather than being partially in a templet perforation, is avoided by the yielding connection between shaft 60 and arm 72, which connection is illustrated particularly in Fig. 11. The normal compression upon spring 77 effected by the position of nut 76 on pin 74 is such that the spring will not normally be further compressed by the forcing of the finder pin into a templet perforation, but will be compressed in case the electro-magnet turns shaft 60 when the lower end of the finder pin rests upon an unperforated portion of the face of the templet. Not only does this yielding connection prevent injury to the finder pin driving connections, but prevents the finder pin from perforating the templet under the conditions just explained.

Figure 5:
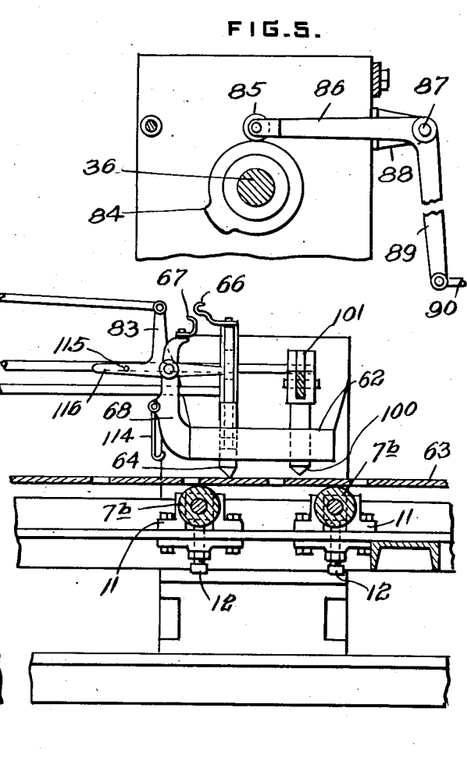
Fig. 5 a sectional view of a detail of construction taken on the plane indicated by the line V—V, Fig. 6.

Means are provided for withdrawing the finder pin from a templet perforation after it has been forced into the perforation for centering the work. This is preferably done by direct mechanical connections with the reciprocating head mechanism of the punch. As seen particularly in Figs. 10 and 11, the finder pin may be provided with a slot 80 adapted to receive the outer end of a horizontally disposed arm 81, the upper end of the slot being adjacent to the upper side of the arm after the finder pin has been forced into a templet perforation. Arm 81 is attached to a shaft 82, rotatably mounted in bracket 68, and having attached to it an upwardly extending arm 83. As seen particularly in Figs. 4 and 5, punch shaft 36 has attached to it a cam 84, on which rests a roller 85 attached to an arm 86 of a bell-crank lever pivoted as at 87 to a bracket 88 attached to the punch frame. The other arm 89 of this bell-crank lever is connected by means of a rod 90 to arm 83 of the finder-pin releasing member. The arrangement here is such that the projecting portion of cam 84 raises arm 86 of the bell-crank lever, which, through its arm 89, rod 90, arm 83, shaft 82 and arm 81 raises the finder pin. Cam 84 is so positioned on shaft 36 that this withdrawal of the finder pin takes place substantially simultaneously with the upward movement of the reciprocating head. A workman may then immediately move the work support to move the templet so that when the finder pin is again released its lower end will not be in registration or partial registration with the perforation from which it was withdrawn.

The machine also includes provision for breaking the circuit through the electro-magnet so that clutch-controlling pin 47 (Figs. 6 and 15) may be released to engage cam 48 of clutch member 40. For this purpose the outer end of punch shaft 36 may, as shown in Fig. 4, be provided with a second cam 91 adapted to move an arm 92 provided with a contactor 93 arranged to cooperate with a contactor 94 mounted in a bracket 95 attached to the punch frame. The position of cam 91 upon punch shaft 36 is such that the projection of the cam holds contactor 93 in contact with contactor 94 when shaft 36 is not being rotated, and that shortly after the commencement of its rotation, and after the finder pin has centered the work, arm 92 is lowered to break contact between contactors 93 and 94, and accordingly break the circuit through the electro-magnet.

The large majority of holes required to be punched in structural plates or similar blanks are of the same size, and in this embodiment of the invention such holes are punched by punch 38, and the final positioning of the plates for such punching is effected by finder pin 64 in the manner explained. Occasionally, however, it is necessary to provide a blank with a few odd holes of a different size, and for this purpose the punching head is provided with punch 39. To center the blank for punching the odd holes and to control the operation of the two punching tools, there is preferably provided a second, and manually operable, finder pin having suitable connections with gags arranged in the punch holders.

Figure 3:
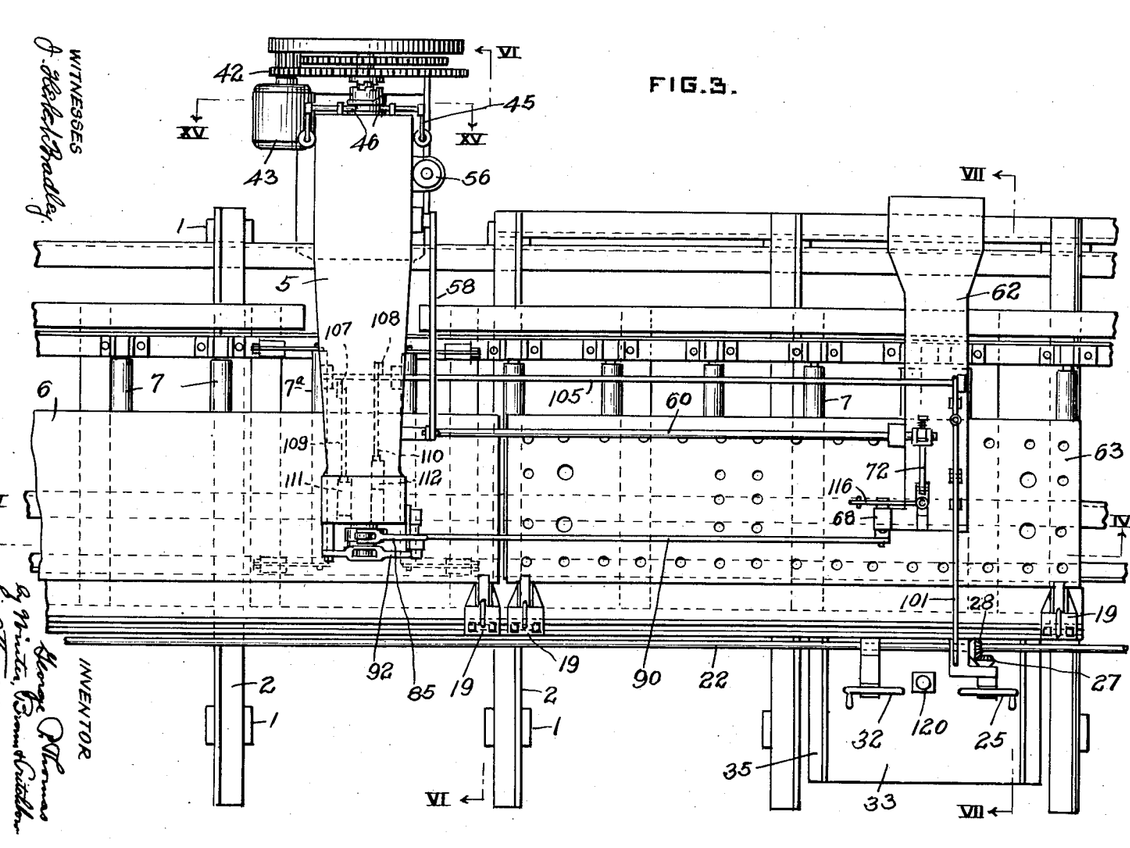
Fig. 3 a plan view to enlarged scale of the central portion of the machine shown in Figs. 1 and 2, the perforating machine and finder pin mechanism, and the connections between them, being shown in this view.

As seen in Figs. 4 and 7, a manually controlled finder pin 100 is attached to an arm 101 pivoted through a link 102 to finder-pin frame 62. The outer end of arm 101 extends to a position for engagement by a workman standing on platform 33, and its inner end is connected through a link 103 and an arm 104 to a rock shaft 105 extending from frame 62 to a bracket 106 attached to punch frame 5. Attached to shaft 105 there are a pair of arms 107 and 108 (Figs. 3 and 6) which, through links 109 and 110, are connected to gags 111 and 112, respectively, for controlling the operation of punches 38 and 39. Normally the inner end of arm 101 is held downwardly by a spring 113 (Fig. 7) so as to hold gag 111 inwardly, gag 112 outwardly, and finder pin 101 out of engagement with the templet. In such positions of these gags, the downward movement of reciprocating head 37 causes punching tool 38 to perforate a blank and permits punching tool 39 to move upwardly in its holder. When it is desired to punch an odd sized hole by punch 39, the position of the blank is fixed by depressing finder pin 100 through lowering the outer end of arm 101. This causes shaft 105 to rock, and its rocking reverses the position of the gags, bringing punch 39 into operation and permitting punch 38 to be idle. The releasing of arm 101 permits spring 113 to operate upon its inner end to move such end downwardly and thereby cause shaft 105 to rock in the opposite direction to reverse the gags.

To prevent the operation of finder pin 64 during the punching of odd holes, it may be held above templet 63 by means of a suitable latch 114 (Fig. 4) pivotally attached to bracket 68 and adapted to engage a pin 115 attached to an arm 116 connected to arm 83. If desired, finder pin 64 may be held upwardly merely by the workman pressing downwardly upon arm 116 without using latch 114.

For the punching of odd holes, as well as for any other reason that may arise during the punching operation, provision is made to manually close the circuit through the electro-magnet. This may be conveniently done by mounting a foot-operated electric switch 120 (Figs. 3, 7 and 16) on operators' platform 33. This switch controls through conductors 117 and 118, a short circuit through electro-magnet coil 56 in the manner plainly indicated in Fig. 16.

In the operation of the whole machine illustrated herein, a templet 63 is placed upon frame 4 and clamped to carriage 13 by means of the clamping jaws 16. A plate to be punched may then be slid laterally upon roller 7 of frame 4 and similarly clamped to carriage 13 in the proper position with relation to the templet. A workman standing on platform 33 may turn operating wheels 25 and 32 to move frame 4 upon table 1 and carriage 13 upon frame 4 to bring a templet perforation in partial registration with finder pin 64. The movement of the frame upon the table is effected through shaft 22 and pinions 33, which are attached to it, and which engage racks 34 on the end standards of table 1. The movement of the carriage upon the frame is effected through pinion 30 and rack 29 attached to the carriage.

As soon as a templet perforation is brought into partial registration with finder pin 64, such pin, which bears freely upon the templet, partially enters the perforation with the result that electric contactor 66 borne by the pin engages fixed electric contactor 67 and closes the circuit through the electro-magnet. In this stage of the operation of the machine, contactor 93 is in engagement with contactor 94 as illustrated in Figs. 4 and 16. This closing of the circuit through the electro-magnet energizes the magnet, with the result that its armature 55 is raised to perform the double operation of permitting clutch member 40 to engage clutch member 41, and of rocking shaft 60. The connections from armature 55 for releasing clutch member 40 are through rod 54, lever 53, link 52, arm 51, shaft 50, arm 49 and pin 47, the pin being withdrawn from engagement with cam 48 of clutch member 40 by the upward movement of the magnet armature. The connections from armature 55 for rocking shaft 60 are through bell-crank lever 57, link 58 and arm 59 attached to this shaft. The rocking of this shaft is effective through arms 75, 73 and 72 and sleeve 71 to force the finder pin into the templet perforation for centering the work in proper punching position.

As the reciprocating head 37 of the punch rises after the punching operation, finder pin 64 is withdrawn from the templet perforation, so that the work support may be moved before the finder pin is released to bear upon the templet. The connections for withdrawing the finder pin are through cam 84 attached to punch shaft 36, bell-crank lever 86, 89, rod 90, arm 83, shaft 82 and arm 84, which engages the finder pin through its slot 80. After the clutch has been thrown to cause punch shaft 36 to rotate, the circuit is broken through the electro-magnet by contactor 93 moving away from contactor 94. This deenergizes the magnet so that the clutch may be withdrawn, and also to release the downward pressure exerted on finder pin 64.

For punching odd holes, manually operable finder pin 100 is lowered into a templet perforation by depressing arm 101, which, through arm 104, shaft 105 and links 109 and 110 reverses the gags 111 and 112 of punches 38 and 39.

According to the provisions of the patent statute, I have explained the principle and operation of my invention and have described it fully in connection with the illustrative embodiment of the invention, which is the best known to me at the present time.

However, I desire to have it understood that, within the scope of the appended claims, the invention may be practiced by other forms of construction than that particularly illustrated and described, and that various features of the invention may be practiced without other features.

I claim:

1. The combination with a metal perforating machine, of a universally movable templet and work support comprising a table, a frame mounted on said table for movements to and from said machine and provided with a plurality of blank-supporting rollers, and a carriage mounted upon one side of said frame for movements at right angles to those of the frame, said carriage being provided at a side thereof with clamps for engaging one side of a blank otherwise resting freely upon said frame rollers.

2. The combination with a metal perforating machine, of a universally movable templet and work support comprising a stationary table, a frame mounted on said table for movements to and from said machine and provided with a plurality of blank and templet supporting rollers, and a carriage mounted upon one side of said frame for movements at right angles to those of the frame, said carriage being provided at a side thereof with a plurality of clamps for engaging one side of a blank and of a templet, both the blank and templet otherwise resting freely upon the said frame rollers.

3. The combination with a metal perforating machine, of a universally movable templet and work support comprising a stationary table, a frame mounted on said table for movements to and from said machine and provided with a plurality of blank and templet supporting rollers each extending from one to the other side of the frame, and a carriage mounted upon one side of said frame for movements at right angles to those of the frame, said carriage being provided at a side thereof with clamps for engaging one side of a blank and one side of a templet both resting freely upon said frame rollers.

4. The combination with a metal perforating machine, of a movable work support provided with means for attaching to it a blank to be perforated and a perforated templet, a finder pin supported for movement toward a face of said templet; and means, rendered effective by partial entry of said pin into a templet perforation, for forcing the pin further into the perforation to move the work support so that a blank attached to it is brought to proper position for perforation by said machine.

5. The combination with a metal perforating machine, of a movable work support provided with means for attaching to it a blank to be perforated and a perforated templet, a finder pin normally urged toward and into bearing contact with a face of said templet; and means, rendered effective upon partial entry of said pin into a templet perforation, for forcing the pin further into the perforation to move the work support so that a blank attached to it is brought to proper position for perforation by said machine.

6. The combination with a metal perforating machine, of a movable work support provided with means for attaching to it a blank to be perforated and a perforated templet, a finder pin above said templet and resting upon its upper face; and means, rendered effective by partial entry of said pin into a templet perforation, for forcing the pin further into the perforation to move the work support to blank-centering position.

7. The combination with a metal perforating machine, of a movable work support provided with means for attaching to it a blank to be perforated and a perforated templet, a finder pin mounted for longitudinal movement above said templet and having its lower end bearing under force of gravity upon the upper face of the templet; and means, rendered effective by partial entry of said pin into a templet perforation for forcing the pin further into the perforation to move the work support to blank centering position.

8. The combination with a metal perforating machine, of a movable work support provided with means for attaching to it a blank to be perforated and a perforated templet, a finder pin freely movable towards said templet and bearing upon a face thereof, a prime mover connected to said pin for moving it; and means, rendered effective upon partial entry of the pin into a templet perforation, to cause said prime mover to force the pin further into the perforation to move the work support to blank-centering position.

9. The combination with a metal perforating machine, of a movable work support provided with means for attaching to it a blank to be perforated and a perforated templet, a finder pin supported for movement towards said templet and having a tapered end bearing upon a face thereof; and means, rendered effective by entry of said pin into a templet perforation, for forcing the pin further into the perforation to move the work support to blank-centering position.

10. The combination with a metal perforating machine, of a movable work support provided with means for attaching to it a blank to be perforated and a perforated templet, a finder pin freely supported for movement towards said templet and provided with an electric contactor movable with it, a fixed contactor lying in the path of movement of said pin contactor, and an electro-magnet in circuit with said contactors and having a movable element operatively connected to said pin for moving it, said circuit being closed through said contactors and electro-magnet upon partial movement of said pin into a templet perforation, and said magnet then being effective to force said pin further into the perforation and to thereby move the work support to blank-centering position.

11. The combination with a metal perforating machine, of a movable work support provided with means for attaching to it a blank to be perforated and a perforated templet, a finder pin freely supported above said templet for movement toward it and provided with an electric contactor movable with the pin, a fixed contactor lying in the path of movement of said pin contactor, an electro-magnet having a coil in circuit with said contactors and having an armature operatively connected to said pin for moving it, said circuit being closed through said contactor and electro-magnet coil upon partial movement of said pin into a templet perforation, and said electro-magnet then being effective to force said pin further into the perforation and to thereby move the work support to blank-centering position.

12. The combination with a metal perforating machine, of a movable work support provided with means for attaching to it a blank to be perforated and a perforated templet, a fixed frame adjacent to a templet borne by said support, a finder pin mounted for longitudinal movement towards said templet and having an end bearing upon the face of the templet, and means rendered effective by partial entry of said pin into a templet perforation for forcing the pin further into the perforation to move the work support so that a blank attached to it is brought to proper position for perforation by said machine.

13. The combination with a metal perforating machine, of a movable work support provided with means for attaching to it a blank to be perforated and a perforated templet, a fixed frame adjacent to a templet borne by said support, a finder pin mounted for longitudinal movement on said frame and having its end bearing upon a face of said templet, finder pin engaging means permitting free movement of the finder pin into a templet perforation, a prime mover operatively connected to said engaging means, and means rendered effective by partial entry of said pin into a templet perforation for causing said prime mover through its connection to said pin to force the pin further into the perforation to move the work support to blank-centering position.

14. The combination with a metal perforating machine, of a universally movable work support comprising a table, a frame mounted on said table for movements to and from said machine, a carriage mounted on said frame for movements at right angles to those of the frame and provided with means for attaching a blank and a perforated templet to it; a finder pin mounted for movement toward a face of a templet attached to said carriage; and means, rendered effective by partial entry of said pin into a templet perforation, for forcing the pin further into the perforation to move the work support to blank-centering position after said support has been otherwise moved nearly to such position.

15. The combination with a metal perforating machine, of a universally movable templet and work support comprising a table, a frame mounted on said table for movements to and from said machine, a carriage mounted upon one side of said frame for movements at right angles to those of the frame and provided with means for engaging a blank and a perforated templet, a finder pin arranged above a perforated templet attached to said carriage and longitudinally movable towards said templet, said finder pin being provided with an electric contactor movable with it and having a tapered end bearing upon the upper face of said templet, a fixed contactor lying in the path of movement of said pin contactor, an electro-magnet in circuit with said contactors and having a movable element operatively connected to said pin for moving it, said circuit being closed through said contactors and electro-magnet upon partial movement of said pin into a templet perforation, and said magnet being effective to force said pin further into the perforation and to thereby move the work support to blank-centering position.

16. The combination with a metal perforating machine, of a universally movable work support provided with means for attaching to it a blank to be perforated and a perforated templet, a finder pin mounted for longitudinal movement above the templet and having its lower end normally urged toward and bearing upon the upper face of the templet; means, rendered effective upon partial entry of said pin into a templet perforation, for forcing the pin further into the perforation to move the work support, and means for holding the finder pin against movement into a templet perforation.

17. The combination with a metal perforating machine, of a movable work support provided with means for attaching to it a blank to be perforated and a perforated templet, a finder pin freely supported for movement toward said templet and provided with an electric contactor, a fixed electric contactor lying in the path of movement of said pin contactor, an electro-magnet in circuit with said contactors and having a movable element, a yielding connection between said movable element of the electro-magnet and said pin for moving the latter in response to the movement of the former, said circuit being closed through said contactors and magnet upon partial movement of said pin into a templet perforation, and said magnet then being effective for forcing said pin into the perforation and to thereby move the work support to blank-centering position.

18. The combination with a metal perforating machine, of a movable work support provided with means for attaching to it a blank to be perforated and a perforated templet, a frame adjacent to a templet attached to said support, a finder pin mounted for longitudinal movement in said frame and provided with a tapered end bearing upon the upper face of the templet, an electric contactor attached to and movable with said finder pin, a fixed electric contactor lying in the path of movement of said pin contactor, an electro-magnet having a coil in circuit with said contactors and having a movable armature, a yielding connection between said armature and said pin for moving the latter in response to the movement of the former, said circuit being closed through said contactors and electro-magnet coil upon partial movement of said pin into a templet perforation, and said armature then being effective to force said pin further into said perforation and to thereby move the work support so that a blank attached to the work support is brought to proper position for perforation by said machine.

19. The combination of a metal punching machine having a reciprocating head, a clutch for controlling the reciprocation of said head, power mechanism for moving said clutch, a movable support provided with means for attaching to it a blank to be punched and a templet, and means operated by said clutch-moving mechanism and cooperating with said templet for moving said support to place said blank in proper punching position after said support has been otherwise moved to bring the blank close to proper punching position.

20. The combination of a metal punching machine having a reciprocating head, a clutch for controlling the reciprocation of said head, means for moving said clutch, a movable support provided with means for attaching to it a blank to be punched and a perforated templet, a finder pin supported for free movement toward said templet and having an end bearing upon a face of the templet, connections between said clutch moving means and said pin for causing the former to move the latter, and means rendered effective by partial entry of said pin into a templet perforation to set said clutch moving means in operation, whereby said clutch is thrown and said pin forced further into the templet perforation.

21. The combination of a metal punching machine having a reciprocating head, a clutch for controlling the reciprocation of said head, an electro-magnet having a movable element attached to said clutch for operating it, a movable support provided with means for attaching to it a blank to be punched and a perforated templet, a finder pin supported for free movement toward said templet and having an end bearing upon a face of the templet, connections between said movable magnet element and said pin for causing the former to move the latter, an electric circuit through said magnet, and means for closing said circuit rendered effective when said pin partially enters a perforation in said templet.

22. The combination of a metal punching machine having a reciprocating head, a clutch for controlling the reciprocation of said head, an electro-magnet having a movable armature attached to said clutch for operating it, a universally movable support provided with means for attaching to it a blank to be punched and a perforated templet, a finder pin mounted for longitudinal movement above and having its end resting upon the upper face of said templet, said finder pin being provided with an electric contactor movable with the pin, a fixed electric contactor lying in the path of movement of said pin contactor, an electric circuit through said contactors and said magnet, and connections between said magnet armature and said pin for causing the former to move the latter, said electro-magnet being energized by the closing of said circuit when said pin partially enters a perforation in said templet.

23. The combination of a metal punching machine having a reciprocating head, means for controlling the reciprocation of said head, a movable support provided with means for attaching to it a blank and a templet, means for engaging said templet and through such engagement moving said support to place said blank in proper punching position after said support has been otherwise moved to bring the blank close to proper punching position, means for operating said head-controlling means and said support-moving means, and means coordinated with the reciprocation of said head for releasing said templet-engaging means.

24. The combination of a metal punching machine having a reciprocating head, a clutch for controlling the reciprocation of said head, means for moving said clutch, a universally movable support provided with means for attaching to it a blank and a templet, a finder pin supported for free movement toward said templet and having an end bearing upon a face of the templet, connections between said clutch-moving means and said pin for causing the former to move the latter, means rendered effective by partial entry of said pin into a templet perforation to set said clutch-moving means in operation, whereby said clutch is thrown and said pin forced further into the templet perforation, and means coordinated with the reciprocation of said head for withdrawing said pin from the templet perforation.

25. The combination of a metal punching machine having a reciprocating head, an electro-magnet having a movable element attached to said clutch for operating it, a movable support provided with means for attaching to it a blank to be punched and a perforated templet, a finder pin mounted above said templet for free longitudinal movement toward the templet and having its end bearing upon the upper face of the templet, connections between said movable magnet element and said pin for causing the former to move the latter, means for closing said circuit rendered effective when said pin partially enters a perforation in said templet, and connections extending between said head and said finder pin for removing the latter from said templet by and upon the reciprocation of the head.

26. The combination of a metal punching machine having a reciprocating head, means for controlling the reciprocation of said head, a universally movable support provided with means for attaching to it a blank and a templet, a finder pin for engaging said templet, connections between said finder pin and said head-controlling means for moving the former by the latter, and connections between said reciprocating head and finder pin for releasing the latter from engagement with a templet perforation.

27. In a punching machine, the combination of a punch having a reciprocating head equipped with a pair of punching tools, a movable templet and work support, a pair of finder pins arranged to cooperate with a templet borne by said support, and connections extending from one of said pins to said tools whereby a movement of one of the pins into engagement with a templet borne by said support renders one of the tools operative and the other inoperative.

28. In a punching machine, the combination of a punch having a reciprocating head, a clutch for controlling the reciprocation of said head, an electro-magnet having a movable element for operating said clutch, a movable support provided with means for attaching a blank and a perforate templet to it, a finder pin mounted for free movement toward and having an end bearing upon a templet attached to said support, connections extending from said movable magnet element to said pin for causing the former to force the pin into a templet perforation, an electric circuit through said magnet, means effective upon partial entry of said pin into a templet perforation for closing said circuit, and means coordinated with the reciprocation of said head for breaking said circuit.

29. The combination with a metal perforating machine, of a universally movable templet and work support comprising a stationary table, a frame mounted on said table for movements to and from said machine and provided with a plurality of blank supporting rollers, a carriage mounted on one side of said frame for movements at right angles to those of the frame, and clamps secured to said carriage for engaging one side of a blank, said clamps each including a resilient element permitting a blank engaged by them to rest freely upon said frame rollers.

30. The combination with a metal perforating machine, of a universally movable templet and work support comprising a stationary table, a frame mounted on said table for movements to and from said machine and provided with a plurality of blank supporting rollers, a carriage mounted on one side of said frame for movements at right angles to those of the frame; and blank-engaging clamps each including a block attached to said carriage, clamping members for engaging a blank and a resilient plate connecting said block to said clamping members and permitting an engaged blank to rest freely upon said frame rollers.

31. The combination with a metal perforating machine, of a universally movable templet and work support comprising a stationary table, a frame mounted on said table for movements to and from said machine and provided with a plurality of blank-supporting rollers, a carriage mounted upon one side of said frame for movements at right angles to those of the frame, said carriage being provided with means for engaging a blank otherwise resting freely upon said frame rollers, and a reciprocable finder pin arranged above and cooperating with a templet borne by said frame to position a blank for perforating it, two of said frame rollers being arranged adjacent to each other and one on each side of the line of reciprocation of said finder pin to firmly support said templet when said finder pin enters a perforation of the templet.

32. The combination with a metal perforating machine, of a universally movable templet and work support comprising a stationary table, a frame mounted on said table for movements to and from said machine and provided with a plurality of blank-supporting rollers, a carriage mounted upon one side of said frame for movements at right angles to those of the frame, said carriage being provided with means for engaging a blank otherwise resting freely upon said frame rollers, a reciprocable finder pin arranged above and cooperating with a templet borne by said frame to position a blank for perforating it, two of said frame rollers being arranged adjacent to each other and one on each side of the line of reciprocation of said finder pin to firmly support said templet when said finder pin enters a perforation of the templet, and means for adjusting the vertical position of said two frame rollers.

33. The combination with a metal perforating machine, of a universally movable templet and work support comprising a table, a frame mounted on said table for movements to and from said machine and provided with a plurality of blank-supporting rollers, a carriage mounted upon one side of said frame for movements at right angles to those of the frame, and clamps borne by said carriage for adjustment longitudinally thereof and adapted to engage one side of a blank otherwise resting freely upon said frame rollers.

In testimony whereof I sign my name.

GEORGE P. THOMAS.